United States Patent [19]

Okamoto

[11] Patent Number: 5,084,835
[45] Date of Patent: Jan. 28, 1992

[54] METHOD AND APPARATUS FOR ABSOLUTE VALUE SUMMATION AND SUBTRACTION

[75] Inventor: Fuyuki Okamoto, Tokyo, Japan

[73] Assignee: NEC Corporation, Tokyo, Japan

[21] Appl. No.: 432,829

[22] Filed: Nov. 7, 1989

[30] Foreign Application Priority Data

Nov. 7, 1988 [JP] Japan .................. 63-281927

[51] Int. Cl.⁵ ........................................ G06F 7/50
[52] U.S. Cl. ................................................ 364/787
[58] Field of Search .............. 364/787, 715.04, 748

[56] References Cited

U.S. PATENT DOCUMENTS 3,814,925  6/1974  Spannagel ................. 364/748
4,811,272  3/1989  Wolrich et al. ............ 364/748 X

*Primary Examiner*—Heather R. Herndon
*Assistant Examiner*—Long T. Nguyen
*Attorney, Agent, or Firm*—Sughrue, Mion, Zinn, Macpeak & Seas

[57] ABSTRACT

In an absolute value subtraction processing of $|X-Y|$, carry generation and propagation functions and group carry generation and propagation functions are first generated. Then, a carry is calculated at the most significant bit in the summation of a first operand and a complement of "2" of a second operand by use of the above functions. Where the carry is "1", the above summation remains continued. Where the carry is zero, additional first and second functions are generated by inverting logic ORs of the carry generation and propagation functions and of the group carry generation and propagation functions. Thus, the summation of the second operand and a complement of "2" of the first operand is realized by use of the additional functions, the carry propagation function, and the group carry propagation function.

1 Claim, 4 Drawing Sheets

Figures 4A, 4B:
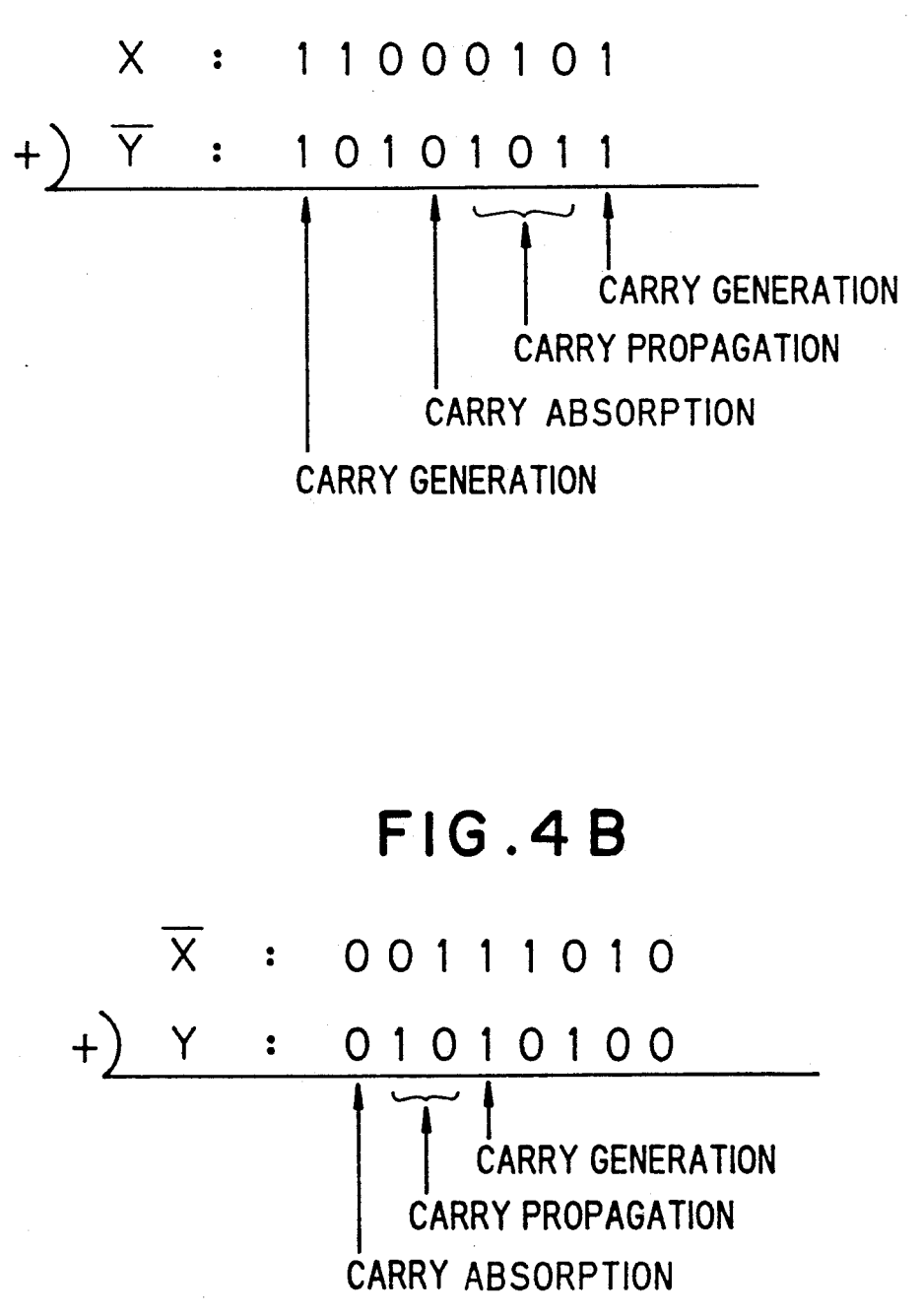

- CARRY GENERATION
- CARRY PROPAGATION
- CARRY ABSORPTION
- CARRY GENERATION

- CARRY GENERATION
- CARRY PROPAGATION
- CARRY ABSORPTION

METHOD AND APPARATUS FOR ABSOLUTE VALUE SUMMATION AND SUBTRACTION

FIELD OF THE INVENTION

The invention relates to a method and an apparatus for absolute value summation and subtraction and more particularly, to a method and an apparatus for absolute value summation and subtraction in which carry look ahead is utilized.

BACKGROUND OF THE INVENTION

In a conventional method for absolute value summation and subtraction, subtraction of two operands X and Y is carried out, wherein one of the two operands X and Y, for instance, the operand Y is converted to a two's complement which is then added to the operand X to provide a difference D. In this case, where the operand X is smaller than the operand Y (X<Y), the difference D becomes a two's complement for an absolute value $|X-Y|$. Therefore, a sequence for calculating the two's complement is necessary to indicate the difference D in the expression of an absolute value. In the calculation of a two's complement of the difference D, summation between an inverted difference $\overline{D}$, in which each bit of the difference D is inverted, and a number having weight at the least significant bit (LSB) is carried out. In this case, the summation is often realized with a high speed by use of carry look ahead. This is to be explained in more detail later.

However, the conventional method for absolute value summation and subtraction has a disadvantage in that subtraction takes a long time to deteriorate a high speed processing thereof, because a sequence for calculating an absolute value of a subtracting result, which is essentially a summation sequence, is inevitable for the subtraction dependent on a comparison in value of two operands.

SUMMARY OF THE INVENTION

Accordingly, it is an object of the invention to provide a method and an apparatus for absolute value summation and subtraction in which summation is realized with a high speed.

According to a first feature of the invention, a method for absolute value summation and subtraction, comprises:

generating a carry generation function G and a carry propagation function P in accordance with two input operands X and Y;

generating a group carry propagation function P* in accordance with said carry propagation function P;

generating a group carry generation function G* in accordance with said carry generation and propagation functions G and P; and carrying out a summation of said two input operands X and Y by use of said carry generation and propagation functions G and P, and said group carry generation and propagation functions G* and P*.

According to a second feature of the invention, an apparatus for absolute value summation and subtraction, comprises:

a first generator for generating a one's complement, to which a control signal instructing one of summation and subtraction between two input operands X and Y, and said operand Y are supplied, said operand Y being passed therethrough at the time of the summation, and said one's complement of said operand Y being supplied therefrom at the time of the subtraction;

a second generator for generating a carry generation function by receiving said operand X and said one's complement;

a third generator for generating a carry propagation function by receiving said operand X and said one's complement;

a fourth generator for generating a group carry generation function by receiving said carry generation and propagation functions;

a fifth generator for generating a group carry propagation function by receiving said carry propagation function;

a carry look ahead for generating a carry from the most significant bit in the summation of said operand X and a two's complement of said operand Y by receiving said carry generation and propagation functions, and said group carry generation and propagation functions;

a converter, through which said carry generation and propagation functions, and said group carry generation and propagation functions are passed at the time of the summation, and where said carry is "1" at the time of the subtraction, and from which a function obtained by inverting a logic OR of said carry generation and propagation functions, a function obtained by inverting a logic OR of said group carry generation and propagation functions, said carry propagation function and said group carry propagation function are supplied, where said carry is "0" at the time of the subtraction; and a sum generator for generating one of a sum and a difference between said operands X and Y by receiving outputs of said converter.

BRIEF DESCRIPTION OF THE DRAWINGS

The invention will be explained in more detail in conjunction with appended drawings, wherein:

FIG. 3 is a flow chart showing operation in the preferred embodiment and FIGS. 4A and 4B are explanatory diagrams showing carry generation, carry propagation, and carry absorption in the preferred embodiment.

DESCRIPTION OF THE PREFERRED EMBODIMENTS

Figure 1:
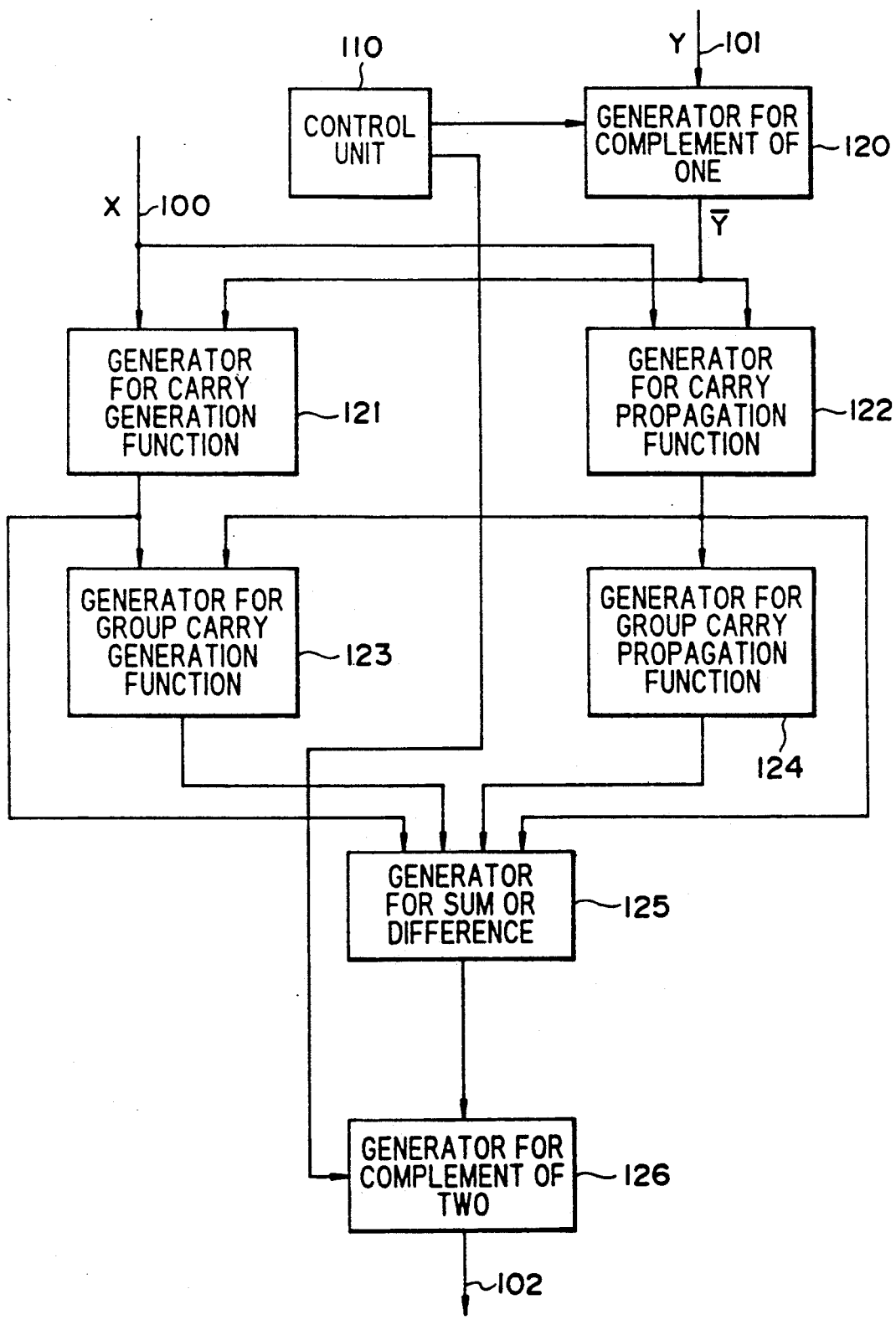
FIG. 1 is a block diagram showing a conventional apparatus for absolute value summation and subtraction in which a conventional method for absolute value summation and subtraction is carried out.

Before explaining an apparatus for absolute value summation and subtraction in a preferred embodiment according to the invention, the aforementioned method for absolute value summation and subtraction will be explained in FIG. 1, wherein symbols $\oplus$, $\wedge$, and $\vee$ indicate an exclusive OR calculation, an AND calculation, and an OR calculation, respectively.

At first, two input operands X and Y of absolute values are supplied to data buses 100 and 101, respectively, and a control signal instructing summation or subtraction is supplied from a control unit 110 to a generator 120 for a one's complement and a generator 126 for a two's complement.

(1) Where summation is carried out

The operand Y is controlled to be passed through the generator 120 for a one's complement, so that the operands X and Y are supplied to a generator 121 for a carry generation function, in which a carry generation function G is generated. The carry generation function G includes a predetermined number of bits, $i_{th}$ bit Gi of which is expressed by an equation, $$Gi = Xi \wedge Yi$$

where Xi and Yi are $i_{th}$ bits of the operands X and Y, respectively.

The bit Gi becomes true, when a carry is generated at the $i_{th}$ bit in the summation of the operands X and Y. The operands X and Y are also supplied to a generator 122 for a carry propagation function, in which a carry propagation function P is generated. The carry propagation function P includes a predetermined number of bits, $i_{th}$ bit Pi of which is expressed by an equation, $$Pi = Xi \oplus Yi$$

and the $i_{th}$ bit Pi indicates whether or not a carry is propagated at the $i_{th}$ bit in the summation of the operands X and Y.

Thus, a calculation of a carry is realized at each bit in the summation of the operands X and Y by use of the carry generation and propagation functions G and P. For this purpose, a number of logic circuits are required to be provided, wherein each logic circuit is necessary to have many input terminals. This results in a difficulty of realizing the apparatus for absolute value summation and subtraction. In practical, therefore, bits of two operands are divided into a predetermined number of groups, in which and among which a carry is first calculated. For instance, the bits are divided to provide plural groups by each three bits. Here, a group carry generation function G* is defined by an equation, $$Gi^* = G_{i+2} V(G_{i+1} \wedge P_{i+2}) V(G_i \wedge P_{i+1} \wedge P_{i+2})$$

where i is an integer selected from 0, 3, 6 - - - .

The bit Gi* becomes true, when a carry is generated from a group to an upper bit $((i+3)_{th}$ bit) in the assumption that the group includes $i_{th}$, $(i+1)_{th}$, and $(i+2)_{th}$ bits.

Further, a group carry propagation propagation function P is defined by an equation, $$Pi^* = P_i \wedge P_{i+1} \wedge P_{i+2}$$

The bit Pi* becomes true, when a carry which is propagated to the LSB ($i_{th}$ bit) of the group is propagated through each bit of the group to an upper $(i+3)_{th}$ bit. Even if the number of bits is not three the group generation and propagation functions G* and P* are generated in generators 123 and 124 by modifying the equations Gi* and Pi*.

Then, a sum of the operands X and Y is obtained in a generator 125 by receiving the carry generation and propagation functions G and P, and the group carry generation and propagation functions G* and P*. For this purpose, a carry is first calculated at each bit in the summation of the operands X and Y by use of carry look ahead.

Here, where it is assumed, for instance, that the bits are divided into a predetermined number of groups by each three bits, a carry $C_7$ is expressed at the seventh bit by an equation, $$C_7 = G_7 V(G_6 \wedge G_7) V(G_3^* \wedge P_6 \wedge P_7) V (G_0^* \wedge P_3^* \wedge P_6 \wedge P_7)$$

In the above equation, each term indicates following states.

(a) the first term
a carry is generated at the seventh bit.
(b) the second term
a carry which is generated at the sixth bit is propagated through the seventh bit.
(c) the third term
a carry which is generated in a group of the third to fifth bits is propagated through the sixth and seventh bits.
(d) the fourth term
a carry which is generated in a group of the zero to second bits is propagated through a group of the third to fifth bits and through the sixth and seventh bits.

A carry is calculated at an arbitrary bit in the same manner as the above.

In the generator 125, a carry is calculated as explained above, and an output $W_1$, of the sum of the operands X and Y is supplied from the generator 125 in accordance with the carry, and the carry propagation function P.

$$W_1 = C_{i-1} \oplus P_i$$

The output $W_1$ is passed through a generator 126 for a two's complement which does not operate at the time of the summation to be provided on a data bus 102.

(2) Where subtraction is carried out

The operand Y is supplied through the data bus 101 to the generator 120 for a complement of "1", in which a one's complement $\overline{Y}$ (each bit of the operand Y is inverted) is generated. The subtraction is realized in the summation by use of a two's complement, that is, by adding the two's complement ($\overline{Y}+1$) to the operand X. The "1" is processed as a carry $C_{-1}$ which is carried to the zero bit (the LSB). In the generators 121 and 122, the carry generation function G and the carry propagation function P are generated, respectively, in accordance with each bit of the operand X and the complement $\overline{Y}$. Then, the group carry generation and propagation functions G* and P* are generated in the generators 123 and 124, respectively, in the same manner as the aforementioned summation. Thereafter, a carry is calculated in the summation of the operand X and the two's complement in accordance with the functions G, P, G* and P*. In this case, a carry $C_{-1}(=1)$ which is carried to the zero bit (the LSB) must be considered as explained before.

Here, where it is assumed, for instance, that the bits are divided into a predetermined number of groups, a carry $C_7$ of the seventh bit is obtained by an equation, $$C_7 = G_7 V(G_6 \wedge P_7) V(G_3^* \wedge P_6 \wedge P_7)$$
$$V(G_0^* \wedge P_3^* \wedge P_6 \wedge P_7) V(C_{-1} \wedge P_0^* \wedge P_3^* \wedge P_6 \wedge P_7)$$

In the above equation, although the definition of the first to fourth terms is the same as that of a corresponding equation in the summation, the fifth term indicating a state where the seventh bit $C_7$ is propagated through a group of the zero to second bits and a group of the third to fifth bits, and through the sixth and seventh bits additionally. A carry of an arbitrary bit is calculated in the same manner as the above.

In the generator 125, a carry is calculated as described above, and the sum of the operand X and the two's complement for the operand Y is obtained in accordance with the carry, and the carry propagation function P. Then, an output of the generator 125 is passed through the generator 126 for a two's complement, where the operand Y is equal to or less than the operand X (Y≦X), while a two's complement for the output of the generator 125 is generated in the generator 126 to be provided on the data bus 102, where the operand X is less than the operand Y (X<Y). That is, an absolute value of the difference in the subtraction is obtained. In deciding which of the operands X and Y is larger, the operand Y is found equal to or less than the operand X, where a carry is generated at the most significant bit (MSB) in the summation of the operand X and the two's complement for the operand Y, while the operand X is found less than the operand Y, where the carry is not generated at the MSB in the summation of the operand X and the two's complement for the operand Y. On the other hand, a complement of the difference D in the subtraction is obtained by adding $\overline{S}$, each bit of which is obtained by inverting each bit of the outputs of the generator 125. However, the method and the apparatus for absolute value summation and subtraction has a disadvantage which is described before.

Accordingly, a method and an apparatus for absolute value summation and subtraction according to the invention are provided as explained in detail hereinafter.

Figure 2:
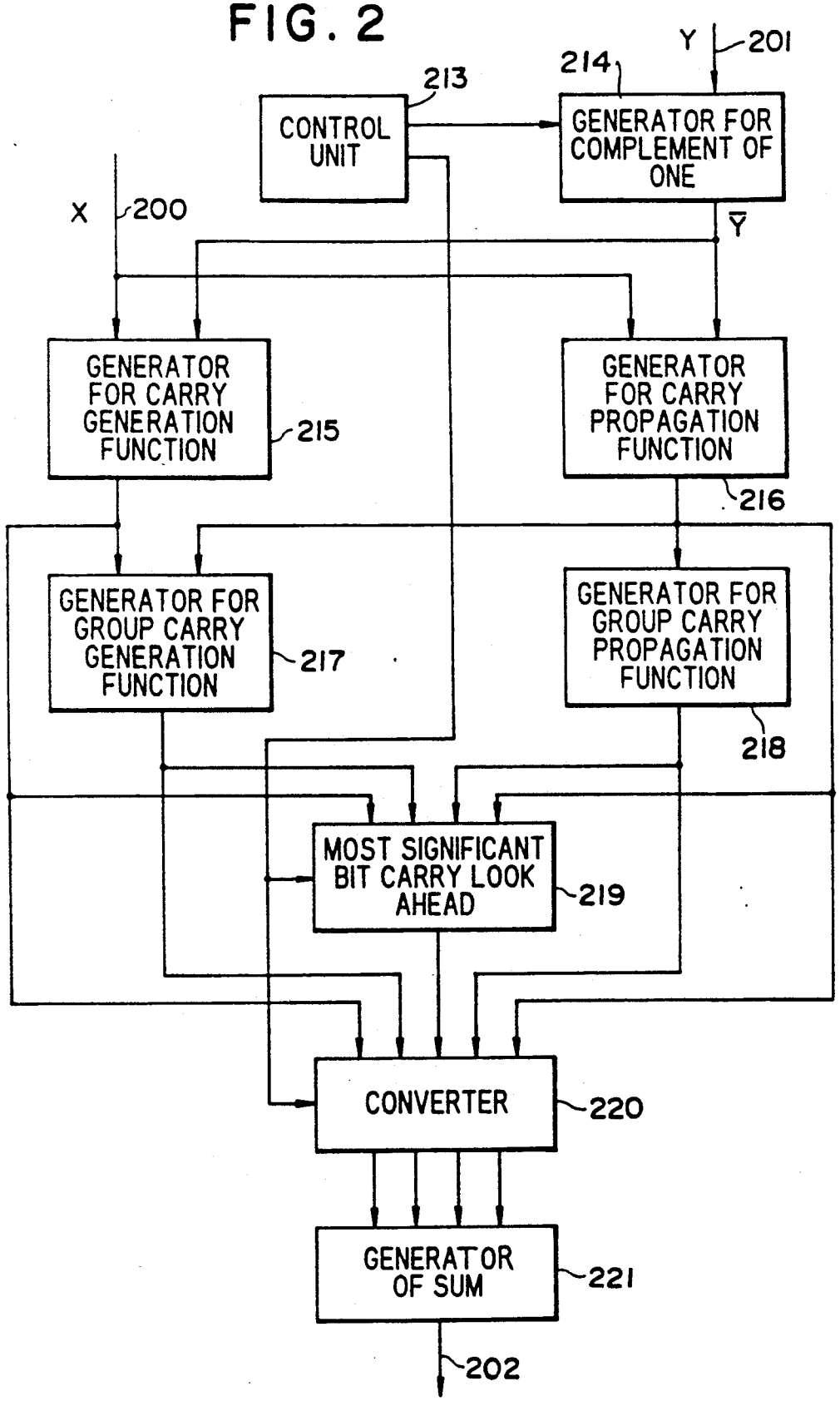
FIG. 2 is a block diagram showing an apparatus for absolute value summation and subtraction in a preferred embodiment according to the invention.

FIG. 2 shows an apparatus for absolute value summation and subtraction in the preferred embodiment according to the invention. In the apparatus for absolute value summation and subtraction, a generator 214 for a one's complement and a generator 215 for a carry generation function are connected to data buses 201 and 200, respectively, and a generator 216 for a carry propagation function is connected to the data bus 200 and the generator 214 for a one's complement which is also connected to the generator 215 for a carry generation function. The generator 216 for a carry propagation function is connected at its output to a generator 217 for a group carry generation function, a generator 218 for a group carry propagation function 218, a MSB carry look ahead 219, and a converter 220, and the generator 215 for a carry generation function is connected at its output to the generator 217 for a group carry generation function, the MSB carry look ahead 219, and the converter 220. Further, the generator 218 for a group carry propagation function and the generator 217 for a group carry generation function are connected at their outputs to the MSB carry look ahead 21 9 and the converter 220, respectively, and the MSB carry look ahead 219 is connected at its output to the converter 220 which is connected at its output to a generator 221 of a sum having an output data bus 202. A control unit 213 is connected to the generator 214 for a one's complement and the converter 220.

Figure 3:
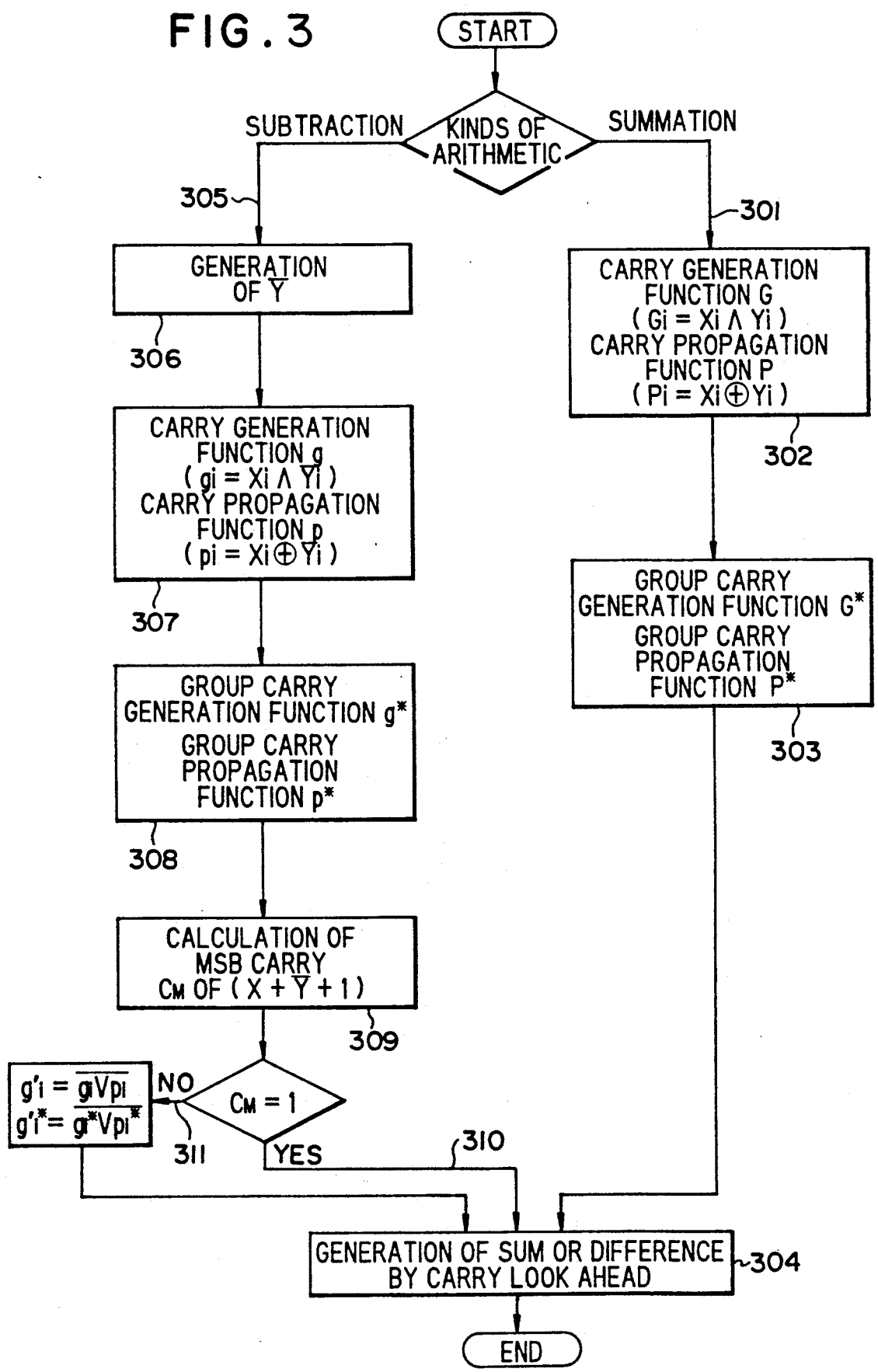

In operation of summation, two input operands X and Y are supplied to the data buses 200 and 201, and a control signal instructing summation is supplied from the control unit 213 to the generator 214 for a one's complement, the MSB carry look ahead 219, and the converter 220 (301 in FIG. 3). Consequently, the generator 214 for a one's complement does not operate, so that the operand Y is merely passed therethough. As a result, a carry generation function G and a carry propagation function P are generated in the generators 215 and 216, respectively (302 in FIG. 3). Then, a group carry generation function G* and a group carry propagation function P* are generated in the generators 217 and 218 in accordance with the carry generation and propagation functions G and P, respectively (303 in FIG. 3). On the other hand, the MSB carry look ahead 219 does not operate in the summation. The carry generation function G, the carry propagation function P, the group carry generation function G*, and the group carry propagation function P* are passed through the converter 220 by the control signal instructing summation supplied from the control unit 213. In a generator 221 of a sum, finally, a carry is calculated in the summation of the operands X and Y based on the functions G, P, G* and P* by use of carry look ahead, so that bits of a sum is generated (304 in FIG. 3). The calculation of the functions G, P, G* and P*, a carry of each bit, and the bits of the sum is carried out in the same manner as described in the conventional method. In operation of subtraction, the control signal instructing subtraction is supplied from the control unit 213 to the generator 214 for a complement, the MSB carry look ahead 219, and the converter 220 (305 in FIG. 3). The, a complement $\overline{Y}$ which is a one's complement for the operand Y is generated in the generator 214 (306 in FIG. 3), and a carry generation function g is generated in the generator 215 by receiving the operand X and the complement $\overline{Y}$ (307 in FIG. 3). At the same time, a carry propagation function p is generated in the generator 216 also by receiving the operand X and the complement $\overline{Y}$ (307 in FIG. 3). Then, a group carry generation function g* is generated in the generator 217 by receiving the functions g and p (308 in FIG. 3), and a group carry propagation function p* is generated in the generator 218 by receiving the function p(308 in FIG. 3). Thereafter, a carry $C_M$ of the MSB is calculated in the MSB carry look ahead 219 in the summation of the operand X and a two's complement for the operand Y by receiving the functions g, p, g* and p* (309 in FIG. 3). Where the carry $C_M$ is 1 (310 in FIG. 3), the operand Y is equal to or less than the operand X, so that the functions g, p, g* and p* are passed through the converter 220 to be supplied to the generator 221 of a sum, in which a carry is calculated at each bit in accordance with the functions g, p, g* and p* by use of carry look ahead, so that bits of a difference are obtained in the subtraction between the operands x and Y to be provided on the data bus 202 (304 in FIG. 3). Where the carry $C_M$ is zero (311 in FIG. 3), the operand X is less than the operand Y, so that group carry generation functions g' and g'* are generated in the converter 220 (312 in FIG. 3).

$$g' = \overline{g \vee p}$$

$$g'^* = \overline{g^* \vee p^*}$$

Thus, a carry is calculated at each bit by use of carry look ahead, so that bits of a difference are obtained in subtraction between the operands X and Y to be provided on the data bus 202 (304 in FIG. 3).

Next, it will be explained that the functions g' and g'* are group carry generation functions, where the operand X is less than the operand Y.

A calculation of (X−Y) is realized by adding the operand X, a complement $\overline{Y}$ which is a one's complement for the operand Y, and "1" added to the LSB of the complement $\overline{Y}$ to each other. That is, $$X - Y = X + \overline{Y} + 1$$

On the other hand, a calculation of (Y−X) is realized by adding a complement $\overline{X}$ which is a one's complement for the operand X, the operand Y, and "1" added to the LSB of the operand Y to each other. That is, $$Y-X=\overline{X}+Y+1$$

FIGS. 4A and 4B show two examples in which the operand X is assumed to be $(11000101)_2$, and the operand Y is assumed to be $(010101001)_2$. In the above two equations, the term of "+1" is processed as a carry which is carried to the LSB. Therefore, this term is not considered in the two examples.

FIG. 4A shows the first example in which $(X+\overline{Y})$ is calculated, wherein a carry is generated at the LSB (the zero bit) having a combination of "1" and "1", and the carry is propagated through the first to third bits having a combination of "1" and "0", and absorbed at the fourth bit having a combination of "0" and "0". Further, a carry is generated at the seventh bit in the first example.

FIG. 4B shows the second example in which $(\overline{X}+Y)$ is calculated, wherein a carry is generated at the fourth bit, and propagated through the fifth and sixth bits to be absorbed at the seventh bit.

As understood from the above first and second examples, the generation and the absorption of a carry is reverse between $(X+\overline{Y})$ and $(\overline{X}+Y)$. Here, if it is assumed that a carry generation function is g in the calculation of $(X+\overline{Y})$, and a carry propagation function is p in the same calculation, a Boolean algebra equation of $\overline{g}\wedge\overline{p}$ becomes true, when both of the $i_{th}$ bits of the operand X and the complement $\overline{Y}$ are zero, because the Boolean algebra equation indicates that a carry is not generated at the $i_{th}$ bit, and a carry of a lower bit is not propagated at the $i_{th}$ bit. That is, the $\overline{g}\wedge\overline{p}$ becomes true, when a carry carried from a lower bit is absorbed at the $i_{th}$ bit thereof. As described before, a combination of "0" and "0" at which a carry is absorbed in the calculation of $(X+\overline{Y})$ is converted to a combination of "1" and "1" at which a carry is generated in the calculation of $(\overline{X}+Y)$. According to the theorem of DeMorgan, $\overline{gi\wedge pi}$ is equal to $\overline{giVpi}(\overline{gi\wedge pi}=\overline{gi}V\overline{pi})$. Therefore, $g'i(=\overline{giVpi})$ is a carry generation function in the calculation of $(\overline{X}+Y)$.

As to carry propagation function p, bits having a combination of "0" and "1" in the calculation of $(X+\overline{Y})$ is not necessary to be converted to bits having the other combination, because the bits has also a combination of "1" and "0" in the calculation of $(\overline{X}``Y)$.

Based on this concept, it is understood that $g'^*_i (=\overline{gi^*Vpi^*})$ is regarded as a group carry function in the calculation of $(\overline{X}+Y)$.

Accordingly, it is understood that the calculation of $|X-Y|$ is realized in accordance with the functions supplied from the converter 220.

As explained above, a carry generation function g, a carry propagation function p, a group carry generation function g*, and a group carry propagation function p*, which are necessary to conduct carry look ahead in the summation of the operand X and the two's complement of the operand Y, are first generated in an absolute value subtraction of $|X-Y|$. Next, a carry of the MSB is calculated in the summation of the operand X and the two's complement of the operand Y by use of the functions g and p, and the functions g* and p*. Where the carry is generated, the operand Y is equal to or less than the operand X, so that the above summation remaines continued by use of the functions g and p, and the function g* and p*. On the other hand, where the carry is not generated, the operand X is less than the operand Y, so that the calculation continues by use of the carry generation function g and the group carry propagation function p* which are given from $g'_i (=\overline{giVpi})$ and $g'^*_i (=\overline{gi^*Vpi^*})$. The g' and g'* are the carry generation function and the group carry generation function in the summation of the operand Y and the two's complement of the operand X. Therefore, the summation of the operand Y and the two's complement of the operand X is realized by use of the functions g' and g'*, and the functions p and p*.

As understood from the above, it is first decided which of the operands X and Y is larger by use of the carry generation and group carry generation functions and the carry propagation and group carry propagation functions. In accordance with the above decision, the carry generation function and the group carry generation function are converted to continue the calculation of subtracting a smaller operand from a larger operand. A processing amount of the above decision and the above conversion is very small. Therefore, a high speed calculation is realized as compared to the conventional method in which an absolute value processing which essentially requires a summation processing is finally carried out.

Although the invention has been described with respect to specific embodiment for complete and clear disclosure, the appended claims are not to be thus limited but are to be construed as embodying all modification and alternative construction that may occur to one skilled in the art which fairly fall within the basic teaching herein set forth.

What is claimed is:

1. An apparatus for absolute value summation and subtraction of a type in which a control unit conditions said apparatus for performing one of said absolute value summation and absolute value subtraction on at least two operands X and Y respectively applied to inputs of said apparatus, said apparatus comprising:

a first generator responsive to said operand Y and an output of said control unit for generating a one's complement of said operand Y and outputting said one's complement of said operand Y when said apparatus is conditioned to perform said absolute value subtraction, and said first generator outputting said operand Y when said apparatus is conditioned to perform said absolute value summation;

a second generator responsive to said operand X and an output of said first generator for performing a carry generation function;

a third generator responsive to said operand X and said output of said first generator for performing a carry propagation function;

a fourth generator responsive to outputs of said second and third generators for performing a group carry generation function;

a fifth generator responsive to an output of said third generator for performing a group carry propagation function;

a carry look ahead means responsive to said outputs of said second and third generators and said control unit, and outputs of said fourth and fifth generators for generating a carry signal representing the most significant bit resulting from a summation of said operand X and a two's complement of said operand Y and outputting said carry signal when said apparatus is conditioned to perform said absolute value summation, said carry look ahead means being rendered inoperative when said apparatus is conditioned to perform absolute value summation;

a converter, responsive to said outputs of said second, third, fourth, and fifth generators, said control unit, and to said carry signal, for passing therethrough said outputs of said second, third, fourth, and fifth generators when said apparatus is conditioned to perform said absolute value subtraction and said carry signal equals a first predetermined value and for passing therethrough said outputs of said second, third, fourth, and fifth generators when said apparatus is conditioned to perform said absolute value summation, and for generating and outputting an inversion of a logic OR of said outputs of said second and third generators, an inversion of a logic OR of said outputs of said fourth and fifth generators when said apparatus is conditioned to perform said absolute value subtraction and said carry signal equals a second predetermined value; and a sum generator responsive to outputs of said converter for generating one of a sum of and a difference between said operands X and Y.

* * * * *

UNITED STATES PATENT AND TRADEMARK OFFICE
CERTIFICATE OF CORRECTION

PATENT NO. : 5,084,835
DATED : January 28, 1992
INVENTOR(S) : Fuyuki Okamoto

It is certified that error appears in the above-identified patent and that said Letters Patent is hereby corrected as shown below:

Col. 5, line 48, delete "21 9" and insert --219--;

Col. 6, line 18, after "a" insert --one's--;

Col. 7, line 47, delete "($\bar{X}$''Y)" and insert --$\bar{X}$ + Y)--.

Signed and Sealed this

Twenty-second Day of June, 1993

Attest:

MICHAEL K. KIRK

*Attesting Officer*   *Acting Commissioner of Patents and Trademarks*